United States Patent [19]

Bell et al.

[11] 3,825,840

[45] July 23, 1974

[54] SOLID STATE RESOLVER

[75] Inventors: Henry P. Bell, Laurel; William H. Licata, Adelphi, both of Md.

[73] Assignee: the United States of America as represented by the Secretary of the Navy, Washington, D.C.

[22] Filed: Apr. 10, 1973

[21] Appl. No.: 349,873

[52] U.S. Cl. .................... 328/28, 307/262, 328/151

[51] Int. Cl. .............................................. H03k 5/08

[58] Field of Search ............ 328/14, 151, 160, 162, 328/27; 367/262

[56] References Cited

UNITED STATES PATENTS

| | | | |
|---|---|---|---|
| 2,643,333 | 6/1953 | Jacobsen | 328/62 |
| 3,710,276 | 1/1973 | Dao | 328/62 |

*Primary Examiner*—Rudolph V. Rolinec
*Assistant Examiner*—B. P. Davis
*Attorney, Agent, or Firm*—R. S. Sciascia; J.A. Cooke; Sol Sheinbein

[57] ABSTRACT

A solid state resolver to provide coordinate conversions in guidance systems. D.C. input signals of R and $\theta$ are supplied with the output of the resolver being R sin $\theta$ and R cos $\theta$. A circuit comprising a field effect transistor is used to sample a sine wave of amplitude R to produce the desired output signals.

4 Claims, 1 Drawing Figure

PATENTED JUL 23 1974 3,825,840
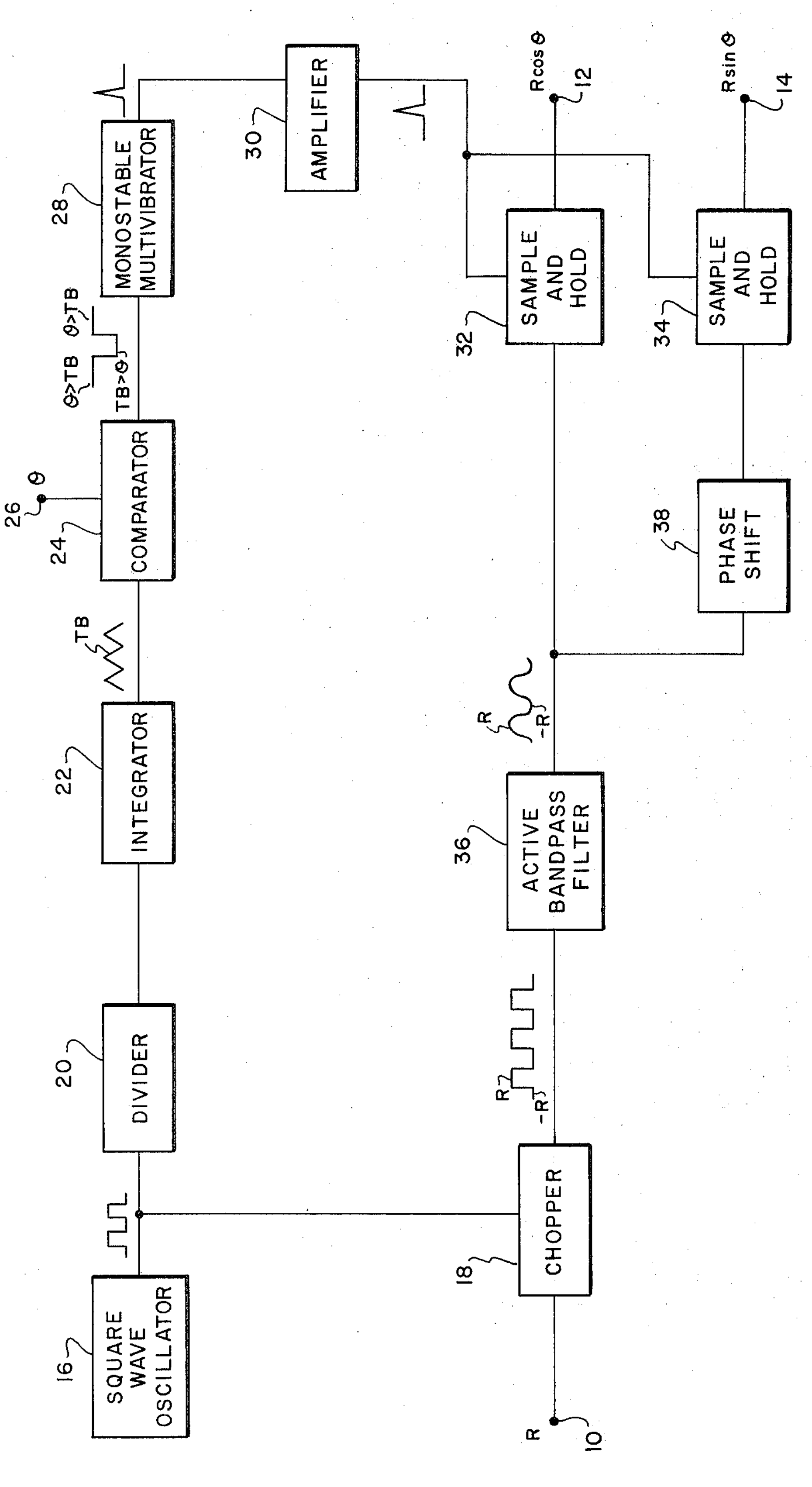

SOLID STATE RESOLVER

BACKGROUND OF THE INVENTION

The present invention relates in general to solid state resolvers, and more specifically to resolvers for providing coordinate conversions in guidance systems.

One of the more important instruments in a guidance system is a resolver to provide coordinate conversions. These must be accurate or the vehicle would be aiming at a wrong point. It is usually an electromechanical device which requires a motor resolver pair and control electronics to position the resolver. The d.c. input signal must also be modulated, fed to the resolver input windings and the output demodulated. This results in a complex and large resolver whose mechanical reliability is much lower than the electrical equivalent. Another approach is to use a nonlinear potentiometer which also requires a motor and control circuitry. More recent resolvers utilize multipliers which require the multiplication of sin $\theta$ with R. This entails expensive multipliers as well as these not being extremely accurate. Some solid state resolvers are presently on the market but are costly and consume a lot of power as well as not being extremely accurate.

In accordance with this invention, these is provided a solid state resolver based on sampling of a sine wave. A square wave oscillator supplies output pulses to a chopper to modulate the d.c. input signal R to be resolved which is then filtered to produce a sine wave. The square wave oscillator output is also integrated and compared with the d.c. angular input signal $\theta$ to produce sampling pulses which then sample the sine wave in field effect transistors to produce the desired R cos $\theta$ and R sin $\theta$ output signals.

OBJECTS OF THE INVENTION

It is therefore an object of the present invention to provide a solid state resolver of relatively low cost and low power consumption.

Another object of the present invention is to provide a compact and lightweight solid state resolver.

Still another object of the present invention is to provide an accurate solid state resolver for use in guidance systems with improved response time.

These and other objects and advantages of the present invention will become apparent from the following description of the illustrative embodiment of the invention taken in conjunction with the accompanying drawing in which:

The FIGURE illustrates a block diagram of the preferred embodiment of the invention.

DESCRIPTION OF THE PREFERRED EMBODIMENT

In missile guidance systems, errors introduced by variations in the yaw and pitch angle must be corrected whereby the missile will be directed along its projected trajectory. Referring to the FIGURE, the input voltage R at terminal 10 represents the d.c. error signal supplied by the missle angular gyro (not shown) to indicate the composite yaw and pitch angle errors. The resolver's two outputs at terminals 12 and 14 are to supply output signals of R cos $\theta$ to the pitch control deflection surface and R sin $\theta$ to the yaw control deflection surface respectively whereby the error signal R will go to zero.

A free running oscillator 16 generates a square wave signal at frequency *f*. The square wave signal is supplied to chopper 18, which may be a junction type field effect transistor, to modulate the d.c. error signal R. This signal is then fed to active bandpass filter 36 tuned to the frequency *f* to produce a sine wave. The square wave signal, after being divided in frequency by two in divider 20 is also integrated in integrator 22 which may comprise an operational amplifier having a feedback loop, to produce a triangular wave to serve as time base. The d.c. angular input signal $\theta$ on terminal 26 is comparted with the time base signal in comparator 24, which may be an operational amplifier. Monostable multivibrator 28 is coupled to the output of comparator 24 and produces a pulse only at the instant when its output pulse goes from TB>$\theta$ to $\theta$<TB. The multivibrator 28 output is amplified in amplifier 30 and supplied to the gates of COS/MOS field effect transistors comprising sample and hold circuits 32 and 34 respectively. The input to the source of the field effect transistors is supplied by active bandpass filter 36 with its signal delayed 90° in phase shifter 38 prior to its being supplied to the source of the field effect transistor comprising sample and hold circuit 34. The sampling pulse produced by monostable 28 thus samples the sine wave produced at filter 36 in sample and hold circuit 32 to produce the desired R cos $\theta$ signal at output terminal 12 (the drain of the FET) and in sample and hold circuit 34 to produce the desired R sin $\theta$ d.c. signal at output terminal 14.

It is therefore seen that there has been described an accurate low cost solid state resolver. The invention is not limited to the embodiments described above, but all changes and modifications thereof not constituting departures from the spirit and scope of the invention are intended to be covered by the following claims.

What is claimed as new and desired to be secured by Letters Patent of the United States is:

1. A resolver comprising:
an oscillator for producing a square wave signal;
an integrator coupled to the output of said oscillator for producing a triangular wave representing a time base signal;
means for comparing said time base signal with the d.c. angular signal $\theta$;
means coupled to the output of said comparing means for producing an output pulse only when said angular signal $\theta$ and said time base signal are of equal amplitude;
means coupled to the output of said oscillator for modulating a d.c. error signal R with said square wave signal;
means coupled to said modulating means for filtering said modulated signal to produce a sine wave signal; and
means coupled to said filtering means and said comparing means for sampling said sine wave signal with said output pulse for producing output signals of R cos $\theta$ and R sin $\theta$.

2. A resolver as recited in claim 1 wherein:
said comparing means comprises an operational amplifier;
said output producing means comprises a one shot multivibrator;
said modulating means comprises a chopper; and
said sampling means comprises two field effect transistors.

3. A resolver as recited in claim 2 further including a 90° phase shifter coupled between said filtering means and one of said field effect transistors.

4. A resolver as recited in claim 3 wherein:

said output pulse is coupled to the gates of said field effect transistors and the output signals are produced on the drains of said field effect transistors.

* * * * *